US012780168B2

(12) United States Patent
Xu et al.

(10) Patent No.: US 12,780,168 B2
(45) Date of Patent: Nov. 3, 2026

(54) EMERGENCY VALVE HAVING EMERGENCY ACCELERATED RELEASE FUNCTION

(71) Applicant: CRRC QIQIHAR ROLLING STOCK CO., LTD., Qiqihar (CN)

(72) Inventors: Yi Xu, Qiqihar (CN); Lidong He, Qiqihar (CN); Mingdong Wang, Qiqihar (CN)

(73) Assignee: CRRC QIQIHAR ROLLING STOCK CO., LTD., Qiqihar (CN)

( * ) Notice: Subject to any disclaimer, the term of this patent is extended or adjusted under 35 U.S.C. 154(b) by 191 days.

(21) Appl. No.: 18/844,703

(22) PCT Filed: Jun. 7, 2023

(86) PCT No.: PCT/CN2023/098989
§ 371 (c)(1),
(2) Date: Sep. 6, 2024

(87) PCT Pub. No.: WO2023/217295
PCT Pub. Date: Nov. 16, 2023

(65) Prior Publication Data

US 2025/0196834 A1 Jun. 19, 2025

(30) Foreign Application Priority Data

May 13, 2022 (CN) ........................ 202210521924.0

(51) Int. Cl.
*B60T 15/02* (2006.01)
*B60T 15/48* (2006.01)

(52) U.S. Cl.
CPC ............ *B60T 15/021* (2013.01); *B60T 15/48* (2013.01)

(58) Field of Classification Search
CPC ....................... B60T 15/021–024; B60T 15/48
See application file for complete search history.

(56) References Cited

U.S. PATENT DOCUMENTS 5,213,397 A 5/1993 Troiani
5,564,794 A * 10/1996 Hart ...................... B60T 13/665 303/3

(Continued)

FOREIGN PATENT DOCUMENTS

CN 201914239 U 8/2011
CN 201970991 U 9/2011

(Continued)

*Primary Examiner* — David R Morris
(74) *Attorney, Agent, or Firm* — Shumaker, Loop & Kendrick, LLP; James D. Miller

(57) ABSTRACT

An emergency valve having an emergency accelerated release function, comprising: an emergency valve body, having an emergency cavity, an air inlet of the emergency cavity being in communication with a train pipe; and an inflation valve, comprising an inflation valve body, a first valve core and a second valve core, wherein the inflation valve body has a driving cavity and an inflation cavity which are spaced apart; the first valve core is movably arranged in the driving cavity and divides the driving cavity into a first driving cavity and a second driving cavity, and the second valve core is movably arranged at an air outlet of the inflation cavity, and an air inlet of the inflation cavity is in communication with a brake cylinder, the air outlet of the inflation cavity is in communication with an air inlet of the first driving cavity, and an air outlet of the first driving cavity is in communication with the emergency cavity, and the second driving cavity is in communication with an emergency chamber; wherein the first valve core has an inflation position at which the second valve core is pushed away from the air outlet of the inflation cavity, and a blocking position at which the second valve core is released.

13 Claims, 10 Drawing Sheets

(56) References Cited

U.S. PATENT DOCUMENTS

| | | | |
|---|---|---|---|
| 2010/0244549 | A1 | 9/2010 | Koshimizu et al. |
| 2016/0068148 | A1 | 3/2016 | Connell et al. |
| 2019/0176791 | A1 | 6/2019 | Potter et al. |
| 2025/0178580 | A1* | 6/2025 | Li .......................... B60T 15/024 |
| 2026/0001522 | A1* | 1/2026 | Xu .......................... B60T 13/68 |

FOREIGN PATENT DOCUMENTS

| | | | |
|---|---|---|---|
| CN | 102303599 | A | 1/2012 |
| CN | 106671966 | A | 5/2017 |
| CN | 211592575 | U | 9/2020 |
| CN | 112172771 | A | 1/2021 |
| CN | 112721900 | A | 4/2021 |
| CN | 114834418 | A | 8/2022 |
| EP | 2261095 | A2 | 12/2010 |
| FR | 2357410 | A1 | 2/1978 |

* cited by examiner

EMERGENCY VALVE HAVING EMERGENCY ACCELERATED RELEASE FUNCTION

CROSS-REFERENCE TO RELATED APPLICATIONS

The present disclosure is a U.S. national phase patent application of PCT/CN2023/098989 filed Jun. 7, 2023, which claims priority to patent application Ser. No. 202210521924.0, filed to the National Intellectual Property Administration of P. R. China on May 13, 2022 and entitled "Emergency Valve Having Emergency Accelerated Release Function", the entire contents of each of which are incorporated herein by reference for all purposes.

TECHNICAL FIELD

The present disclosure relates to the technical field of railway wagons, and in particular, to an emergency valve having an emergency accelerated release function.

BACKGROUND

An air control valve, an auxiliary reservoir, an accelerated release reservoir, and a brake cylinder, etc. constitute a braking system of a railway wagon. The air control valve is a core control component of a vehicle braking system, and controls the vehicle braking system to generate braking, release, etc. When an unexpected danger condition occurs in the train, emergency brake stop needs to be enabled.

In the related art, the air control valve consists of a main valve, a semi-automatic release valve, an emergency valve, and an intermediate body. The emergency valve operates in the case of emergency braking, and achieves the effect of rapidly evacuating pressurized air in a train pipe during emergency braking, thereby improving the response speed during emergency braking, such that the train can rapidly obtain a relatively large braking force in the working condition of emergency braking.

In the related art, when the train is released after emergency braking, it is necessary to inflate train pipes and reservoirs of the whole train to predetermined pressures, and then the train can depart again. When the train is released after emergency braking, air can be supplied to the whole train only by a locomotive, and a large amount of pressurized air consumed by the emergency braking needs to be replenished, and thus a long time is required, which not only affects the railway transportation efficiency, but also consumes a large amount of energy.

SUMMARY

The present disclosure provide an emergency valve having an emergency accelerated release function, so as to solve the problems in the related art that after emergency braking of a train, the release time is long and a lot of energy is consumed.

Some embodiments of the present disclosure provide an emergency valve having an emergency accelerated release function, the emergency valve having an emergency accelerated release function including: an emergency valve body, having an emergency cavity, an air inlet of the emergency cavity being in communication with a train pipe; and an inflation valve, including an inflation valve body, a first valve core and a second valve core, wherein the inflation valve body has a driving cavity and an inflation cavity which are spaced apart; the first valve core is movably arranged in the driving cavity and divides the driving cavity into a first driving cavity and a second driving cavity, and the second valve core is movably arranged at an air outlet of the inflation cavity, and an air inlet of the inflation cavity is in communication with a brake cylinder, the air outlet of the inflation cavity is in communication with an air inlet of the first driving cavity, and an air outlet of the first driving cavity is in communication with the emergency cavity, and the second driving cavity is in communication with an emergency chamber; wherein the first valve core has an inflation position at which the second valve core is pushed away from the air outlet of the inflation cavity, and a blocking position at which the second valve core is released.

Further, the first valve core includes a piston cap and a piston rod connected with each other; wherein an outer edge of the piston cap is attached to a cavity wall of the driving cavity and divides the driving cavity into the first driving cavity and the second driving cavity, and an end of the piston rod is arranged corresponding to the second valve core.

Further, the inflation valve body includes a valve body main body and a check valve body, wherein the valve body main body has the driving cavity and the inflation cavity; the check valve body is arranged in the inflation cavity and is attached to a cavity wall of the inflation cavity, the air outlet of the inflation cavity is a valve port of the check valve body, and the second valve core is movably arranged in the check valve body.

Further, both ends of the check valve body are of an open structure, one end of the check valve body is the valve port of the check valve body, and the other end of the check valve body is provided with a support plate; a first check reset spring is provided between the second valve core and the support plate; and/or the second valve core includes a first ventilation plate and a first elastic cap sleeved on the first ventilation plate; a plurality of first protrusions are provided on a periphery of the first ventilation plate, the plurality of first protrusions are arranged at intervals along a circumferential direction of the first ventilation plate and extend along a radial direction of the first ventilation plate, and the first elastic cap is in sealed fit with the air outlet of the inflation cavity.

Further, the inflation valve body further includes a valve sleeve, wherein the valve sleeve is arranged in the valve body main body, an outer side wall of the valve sleeve is attached to an inner side wall of the valve body main body to divide an inner cavity of the valve body main body into the driving cavity and the inflation cavity; and an end of the first valve core passes through the valve sleeve and is arranged corresponding to the second valve core.

Further, the inflation valve body is further provided with an inflation passage, an air outlet of the inflation passage is in communication with the air inlet of the first driving cavity, and an air inlet of the inflation passage is in communication with the air outlet of the inflation cavity; a check valve is arranged in the inflation passage; the check valve includes a check valve core and a second check reset spring; one end of the second check reset spring abuts against the check valve core, and the other end of the second check reset spring abuts against the inflation valve body.

Further, the emergency valve having an emergency accelerated release function further includes a first valve cover; the first valve cover covers the inflation valve body, and the inflation passage includes a first passage, a second passage and a third passage in communication in sequence; the first passage and the third passage are arranged on the inflation valve body, and the second passage is arranged on the first valve cover; and/or the check valve core includes a second ventilation plate and a second elastic cap sleeved on the second ventilation plate; a plurality of second protrusions are provided on a periphery of the second ventilation plate, the plurality of second protrusions are arranged at intervals along a circumferential direction of the second ventilation plate and extend along a radial direction of the second ventilation plate, and the second elastic cap is in sealed fit with the air inlet of the inflation passage.

Further, the inflation valve body and the emergency valve body are integrally formed.

Further, the emergency valve having an emergency accelerated release function also includes a second valve cover; the second valve cover covers a same end of the emergency valve body and the inflation valve body, a communication passage is arranged on the second valve cover, an air inlet of the communication passage is in communication with the emergency cavity, and an air outlet of the communication passage is in communication with the air outlet of the first driving cavity.

Further, the inflation valve body is further provided with an emergency passage and an air inlet passage arranged at an interval; a first end of the emergency passage is in communication with the emergency chamber, and a second end of the emergency passage is in communication with the second driving cavity; a first end of the air inlet passage is in communication with the air inlet of the inflation cavity, and a second end of the air inlet passage is in communication with the brake cylinder; the air inlet of the emergency cavity, the first end of the emergency passage and the second end of the air inlet passage are all provided at an end of the emergency valve having an emergency accelerated release function away from the second valve cover.

Further, the emergency passage is provided with a necked plug, the necked plug has a central hole extending along an axial direction of the emergency passage; and/or the inflation valve body has an inclined hole, and the emergency passage is in communication with the second driving cavity through the inclined hole.

Further, the piston cap includes a first flat plate, a second flat plate and an elastic pad; an inner ring of the elastic pad is sandwiched between the first flat plate and the second flat plate, an outer ring of the elastic pad is in sealed fit with the cavity wall of the driving cavity, and the piston rod passes through the first flat plate, the second flat plate and the elastic pad in sequence; the piston cap further includes a locking nut; a side wall of the piston rod has an annular convex rib extending in a radial direction of the piston rod; the first flat plate abuts against the annular convex rib, the locking nut abuts against the second flat plate and is in threaded connection with the piston rod; and the first valve core further includes a piston reset spring; one end of the piston reset spring abuts against the piston cap, and the other end of the piston reset spring abuts against the inflation valve body.

Further, the inflation valve further includes a dust filter and a retaining ring; the dust filter is arranged at an end of the driving cavity away from the piston cap, the retaining ring is connected with an inner side wall of the inflation valve body, and an end of the dust filter is attached to a side surface of the retaining ring; the emergency valve having an emergency accelerated release function further includes a driving assembly; the driving assembly movably arranged in the emergency cavity, the driving assembly divides the emergency cavity into an upper emergency cavity and a lower emergency cavity, and the driving assembly has a transition hole, the transition hole communicates between the upper emergency cavity and the lower emergency cavity; and the emergency valve having an emergency accelerated release function further includes an air discharge valve assembly; the air discharge valve assembly is located in the lower emergency cavity, the driving assembly is located above the air discharge valve assembly; and a partition plate is provided in the emergency cavity, and the partition plate divides the lower emergency cavity into an air inlet cavity and an exhaust cavity located below the air inlet cavity, and the partition plate has a deflation hole, the air discharge valve assembly being movably arranged at the deflation hole.

By applying the technical solutions of the present disclosure, the emergency valve having an emergency accelerated release function includes an emergency valve body and an inflation valve; when a train is released after emergency braking, the train pipe is inflated, and since the first driving cavity is in communication with the train pipe through the emergency cavity and the second driving cavity is in communication with the emergency chamber, the inflation speed of the first driving cavity is greater than the inflation speed of the second driving cavity, and thus the pressure of the first driving cavity is greater than the pressure of the second driving cavity; and driven by the pressure difference, the first valve core pushes the second valve core away from the air outlet of the inflation cavity, thus the inflation cavity is in communication with the first driving cavity, such that pressurized air in the brake cylinder enters the emergency cavity through the inflation cavity and the first driving cavity, and is inflated to the train pipe through the emergency cavity, thereby accelerating the inflation speed of the train pipe; and by using the pressurized air in the brake cylinder, the purpose of saving energy is achieved.

BRIEF DESCRIPTION OF THE DRAWINGS

The drawings of the description, constituting a part of the present disclosure, are used for providing further understanding of the present disclosure. The illustrative embodiments of the present disclosure and illustrations thereof are used for explaining the present disclosure, rather than constitute inappropriate limitation on the present disclosure. In the drawings.

Figure 1:
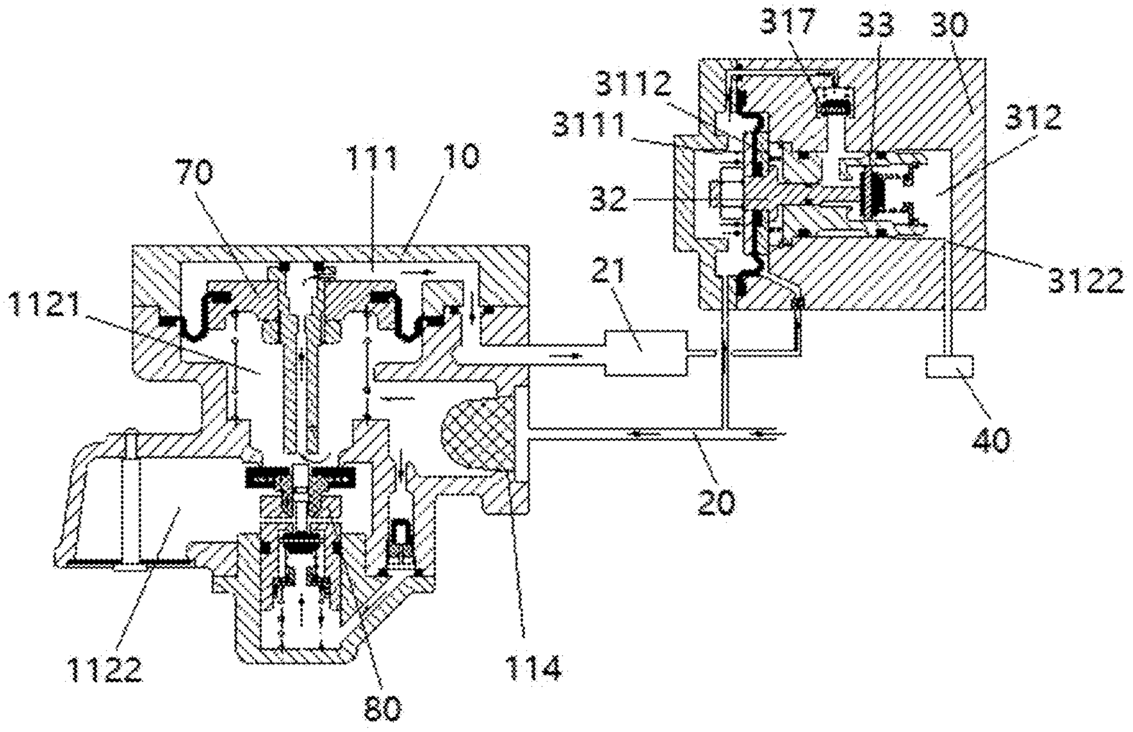
FIG. 1 shows a principle diagram in which an emergency valve having an emergency accelerated release function is located at an inflation position provided according to embodiments of the present disclosure.

The figures include the following reference signs:

10. Emergency valve body; 11. Emergency cavity; 111. Upper emergency cavity; 112.

Lower emergency cavity; 1121. Air inlet cavity; 1122. Exhaust cavity; 113. Partition plate; 1131. Deflation hole;

20. Train pipe; 21. Emergency chamber;

30. Inflation valve; 31. Inflation valve body; 311. Driving cavity; 3111. First driving cavity; 3112. Second driving cavity; 312. Inflation cavity; 313. Valve body main body; 314. Check valve body; 315. Valve sleeve; 316. Inflation passage; 3161. First passage; 3162. Second passage; 3163. Third passage; 317. Check valve; 3171. Check valve core; 3172. Second check reset spring; 318. Emergency passage; 3181. Necked plug; 3182. Inclined hole; 32. First valve core; 321. Piston cap; 3211. First flat plate; 3212. Second flat plate; 3213. Elastic pad; 3214. Locking nut; 322. Piston rod; 3221. Annular convex rib; 323. Piston reset spring; 33. Second valve core; 331. Support plate; 332. First check reset spring; 333. First ventilation plate; 3331. First protrusion; 334. First elastic cap; 34. Dust filter;

40. Brake cylinder;

50. First valve cover;

60. Second valve cover; 61. Communication passage;

70. Driving assembly; 71. Transition hole;

80. Air discharge valve assembly.

DETAILED DESCRIPTION OF THE EMBODIMENTS

Hereinafter, the technical solutions in the embodiments of the present disclosure will be clearly and completely described with reference to the accompanying drawings in the embodiments of the present disclosure. Obviously, the embodiments as described are only some rather than all the embodiments of the present disclosure. The following description of at least one exemplary embodiment is merely illustrative in nature and is in no way intended to limit some embodiments of the present disclosure and any disclosures or uses thereof. All other embodiments obtained by a person of ordinary skill in the art on the basis of the embodiments of the present disclosure without involving any inventive effort shall all fall within the scope of protection of the present disclosure.

As shown in FIGS. 1-11, embodiments of the present disclosure provide an emergency valve having an emergency accelerated release function, the emergency valve having an emergency accelerated release function including: an emergency valve body 10 and an inflation valve 30; wherein the emergency valve body 10 is provided with an emergency cavity 11, an air inlet 114 of the emergency cavity 11 being in communication with a train pipe 20; and the inflation valve 30 includes an inflation valve body 31, a first valve core 32 and a second valve core 33, the inflation valve body 31 having a driving cavity 311 and an inflation cavity 312 which are spaced apart; the first valve core 32 is movably arranged in the driving cavity 311 and divides the driving cavity 311 into a first driving cavity 3111 and a second driving cavity 3112, and the second valve core 33 is movably arranged at an air outlet 3121 of the inflation cavity 312, and an air inlet 3122 of the inflation cavity 312 is in communication with a brake cylinder 40, the air outlet of the inflation cavity 312 is in communication with an air inlet 31111 of the first driving cavity 3111, and an air outlet 31112 of the first driving cavity 3111 is in communication with the emergency cavity 11, and the second driving cavity 3112 is in communication with an emergency chamber 21; wherein the first valve core 32 has an inflation position at which the second valve core 33 is pushed away from the air outlet of the inflation cavity 312, and a blocking position at which the second valve core 33 is released.

By applying the technical solutions in some embodiments of the present disclosure, the emergency valve having an emergency accelerated release function includes the emergency valve body 10 and the inflation valve 30; when a train is released after emergency braking, the train pipe 20 is inflated, and since the first driving cavity 3111 is in communication with the train pipe 20 through the emergency cavity 11 and the second driving cavity 3112 is in communication with the emergency chamber 21, the inflation speed of the first driving cavity 3111 is greater than the inflation speed of the second driving cavity 3112, and thus the pressure of the first driving cavity 3111 is greater than the pressure of the second driving cavity 3112; and driven by the pressure difference, the first valve core 32 pushes the second valve core 33 away from the air outlet of the inflation cavity 312, thus the inflation cavity 312 is in communication with the first driving cavity 3111, such that pressurized air in the brake cylinder 40 enters the emergency cavity 11 through the inflation cavity 312 and the first driving cavity 3111, and is inflated to the train pipe 20 through the emergency cavity 11, thereby accelerating the inflation speed of the train pipe 20; and by using the pressurized air in the brake cylinder 40, the purpose of saving energy is achieved.

In this embodiment, a check valve 317 is provided between the air inlet of the first driving cavity 3111 and the air outlet of the inflation cavity 312. When the train is inflated for the first time, since no pressurized air exists in a braking system, the inflation speed of the first driving cavity 3111 is greater than the inflation speed of the second driving cavity 3112; and driven by the pressure difference, the first valve core 32 pushes the second valve core 33 away from the air outlet of the inflation cavity 312; however, since no pressurized air exists in the brake cylinder 40, the brake cylinder 40 will not inflate the train pipe 20 when the train is inflated for the first time. Also, due to the arrangement of the check valve 317, the pressurized air of the train pipe 20 can be prevented from being directly inflated into the brake cylinder 40 through the first driving cavity 3111. However, when the train is released after emergency braking, the air pressure in the brake cylinder 40 is greater than the air pressure in the first driving cavity 3111, and the pressurized air in the brake cylinder 40 can pass through the inflation cavity 312 and force open the check valve 317, and then inflate the train pipe 20 through the first driving cavity 3111.

The first valve core 32 includes a piston reset spring 323, and in a release working condition after normal braking, since the resultant force of the air pressure of the second driving cavity 3112 and an elastic force of the piston reset spring 323 is greater than the air pressure in the first driving cavity 3111 at this time, the first valve core 32 is located at the blocking position at which the second valve core 33 is released, and the inflation cavity 312 is in a non-communication state with the first driving cavity 3111; therefore, the pressurized air in the brake cylinder 40 will not inflate the train pipe 20.

Specifically, in an emergency braking working condition, pressurized air in both the train pipe 20 and the emergency chamber 21 is discharged into the atmosphere, the brake cylinder 40 receives pressurized air from an auxiliary reservoir, and the pressure of the brake cylinder 40 is increased to the maximum, so as to generate an emergency braking effect which is quick and has a large braking force.

It should be noted that the first valve core 32 having an inflation position at which the second valve core 33 is pushed away from the air outlet of the inflation cavity 312, and a blocking position at which the second valve core 33 is released, means that the first valve core 32 is subjected to the action of the pressure difference between the first driving cavity 3111 and the second driving cavity 3112, and when the train is released after emergency braking, the resultant force of the air pressure of the second driving cavity 3112 and the elastic force of the piston reset spring 323 is greater than the air pressure in the first driving cavity 3111, the first valve core 32 pushes the second valve core 33 away from the air outlet of the inflation cavity 312, so as to be in the inflation position. When there is pressurized air in both the first driving cavity 3111 and the second driving cavity 3112, the air pressures of the two are equal to each other, and under the action of the piston reset spring 323, the first valve core 32 is located at the blocking position at which the second valve core 33 is released.

As shown in FIG. 2 to FIG. 6, the first valve core 32 includes a piston cap 321 and a piston rod 322 connected with each other; an outer edge of the piston cap 321 is attached to a cavity wall of the driving cavity 311, and divides the driving cavity 311 into the first driving cavity 3111 and the second driving cavity 3112, and an end of the piston rod 322 is arranged corresponding to the second valve core 33. The first valve core 32 having the described structure has the advantages of a simple structure and easy installation.

In this embodiment, extension directions of the piston cap 321 and the piston rod 322 are perpendicular to each other.

It should be noted that, the force-bearing area of the piston cap 321 is far greater than the force-bearing area of the second valve core 33, such that the force received by the piston cap 321 can be greater than the force received by the second valve core 33, and then the first valve core 32 can drive the second valve core 33 to move.

As shown in FIG. 2 to FIG. 6, the inflation valve body 31 includes a valve body main body 313 and a check valve body 314, wherein the valve body main body 313 has the driving cavity 311 and the inflation cavity 312; the check valve body 314 is arranged in the inflation cavity 312 and is attached to a cavity wall of the inflation cavity 312, the air outlet of the inflation cavity 312 is a valve port of the check valve body 314, and the second valve core 33 is movably arranged in the check valve body 314. By the cooperation between the check valve body 314 and the second valve core 33, the opening and closing of the inflation cavity 312 can be controlled, achieving the advantages of a simple structure and convenient arrangement.

In this embodiment, an outer side wall of the check valve body 314 is attached to the cavity wall of the inflation cavity 312, and a first sealing ring is provided between the check valve body 314 and the cavity wall of the inflation cavity 312.

Figure 4:
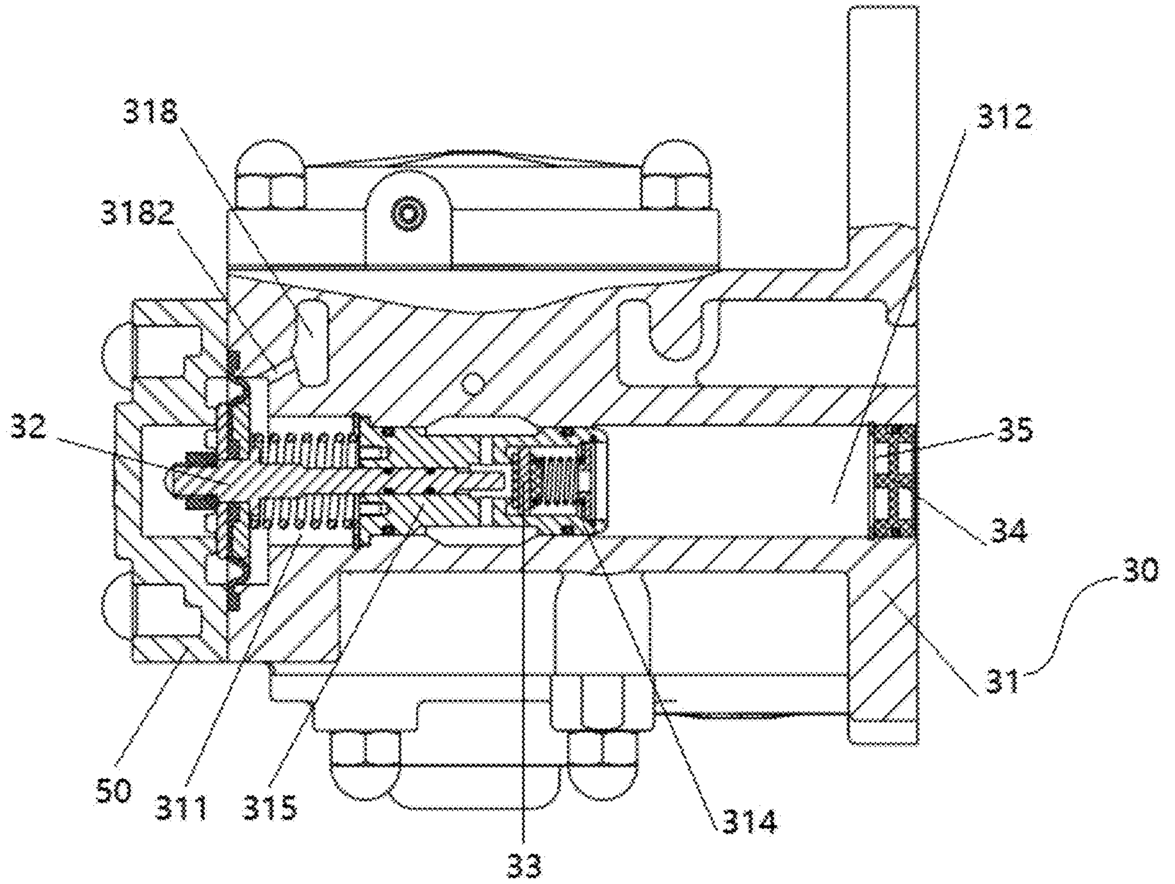
FIG. 4 shows another cross-sectional view of an inflation valve of an emergency valve having an emergency accelerated release function provided according to embodiments of the present disclosure.
Figure 5:
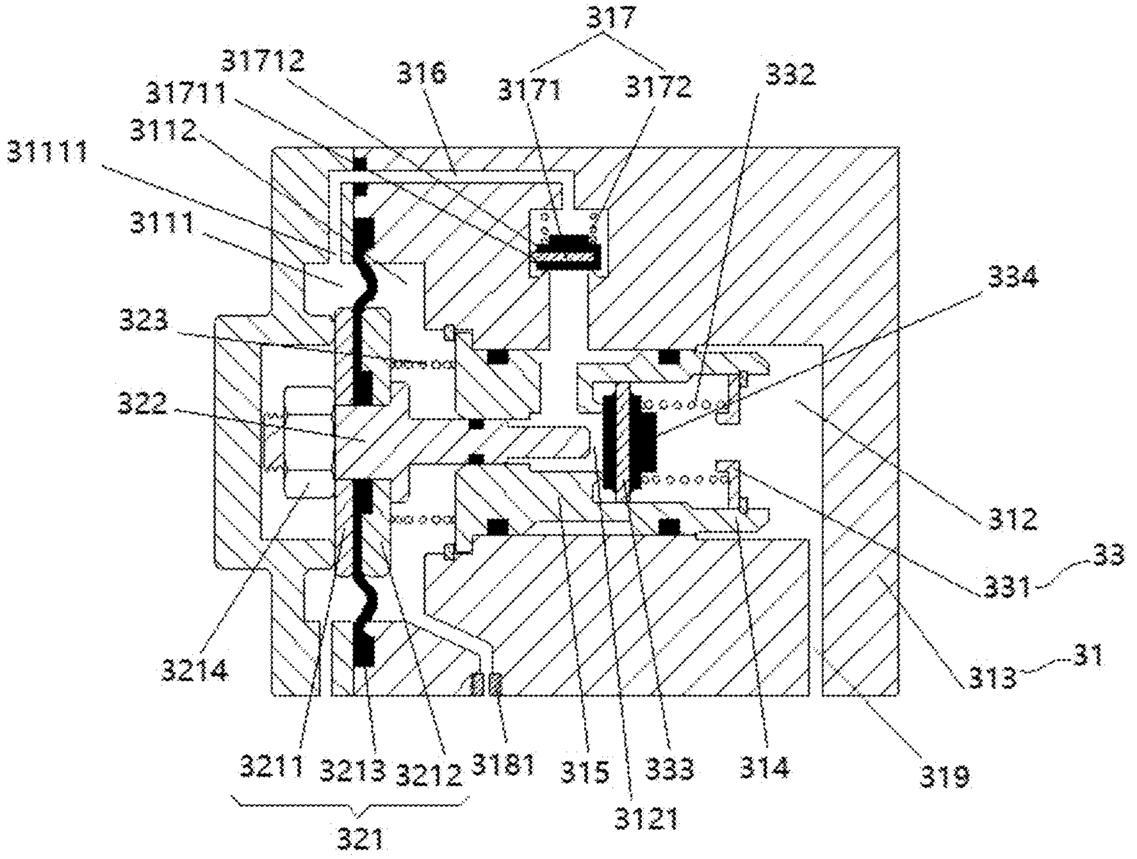
FIG. 5 shows a principle diagram in which an inflation valve of an emergency valve having an emergency accelerated release function is located at a blocking position provided according to embodiments of the present disclosure.
Figure 6:
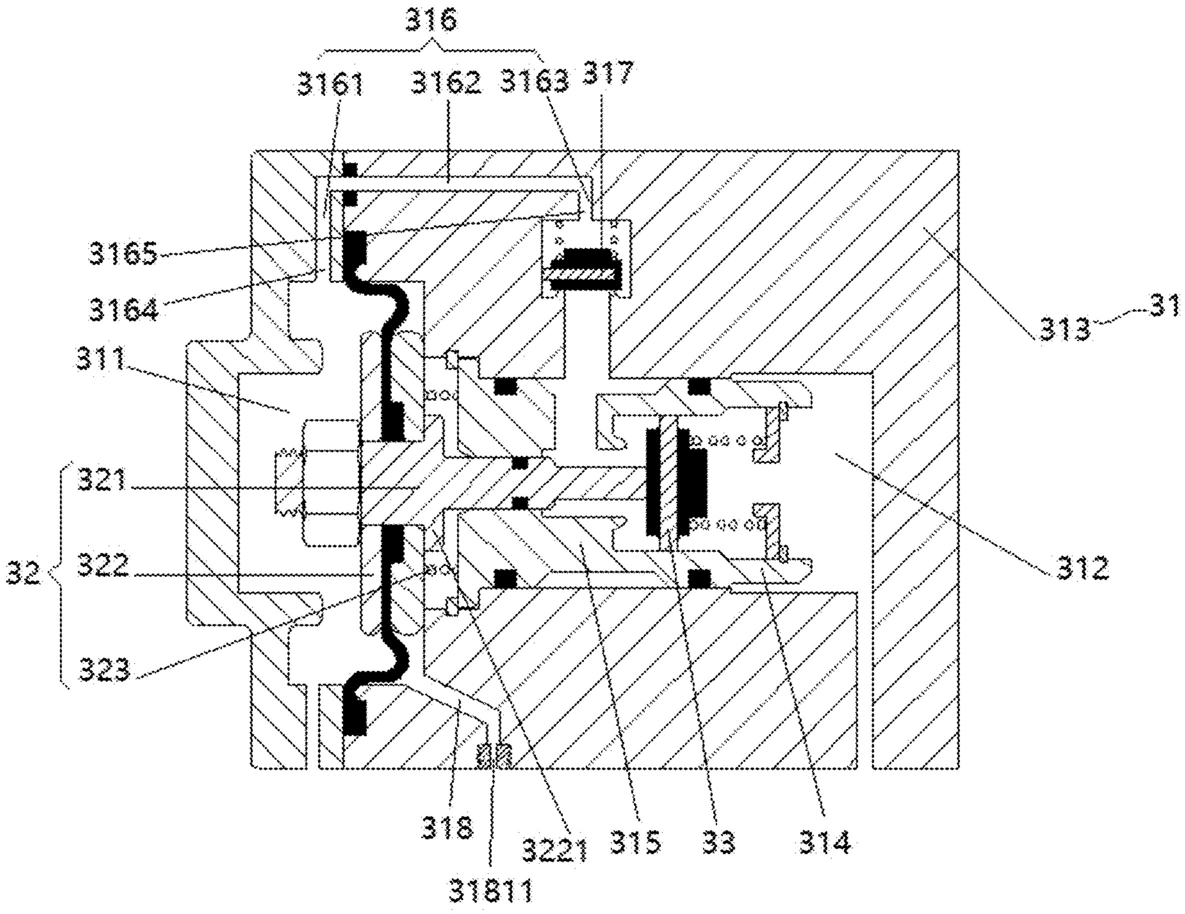
FIG. 6 shows a principle diagram in which an inflation valve of an emergency valve having an emergency accelerated release function is located at an inflation position provided according to embodiments of the present disclosure.

As shown in FIGS. 4 and 5, both ends of the check valve body 314 are of an open structure, one end of the check valve body 314 is the valve port of the check valve body 314, and the other end of the check valve body 314 is provided with a support plate 331; a first check reset spring 332 is provided between the second valve core 33 and the support plate 331, and by using the first check reset spring 332, when the first valve core 32 is separated from the second valve core 33, the second valve core 33 can automatically and quickly reset to the blocking position under the action of the first check reset spring 332.

In this embodiment, the first check reset spring 332 can be supported by using the support plate 331.

Specifically, the second valve core 33 includes a first ventilation plate 333 and a first elastic cap 334 sleeved on the first ventilation plate 333; a plurality of first protrusions 3331 are provided on a periphery of the first ventilation plate 333, the plurality of first protrusions 3331 are arranged at intervals along a circumferential direction of the first ventilation plate 333 and extend along a radial direction of the first ventilation plate 333, and the first elastic cap 334 is in sealed fit with the air outlet of the inflation cavity 312. The first ventilation plate 333 having the described structure has the advantages of a simple structure and easy machining.

In this embodiment, the sealing performance of the second valve core 33 and the check valve body 314 can be enhanced by using the first elastic cap 334.

The first ventilation plate 333 seals an air outlet of the check valve body 314; and when the second valve core 33 is in the inflation position, the first ventilation plate 333 is separated from the air outlet of the check valve body 314, and air from the brake cylinder 40 enters the first driving cavity 3111 through gaps between the plurality of first protrusions 3331.

Figure 2:
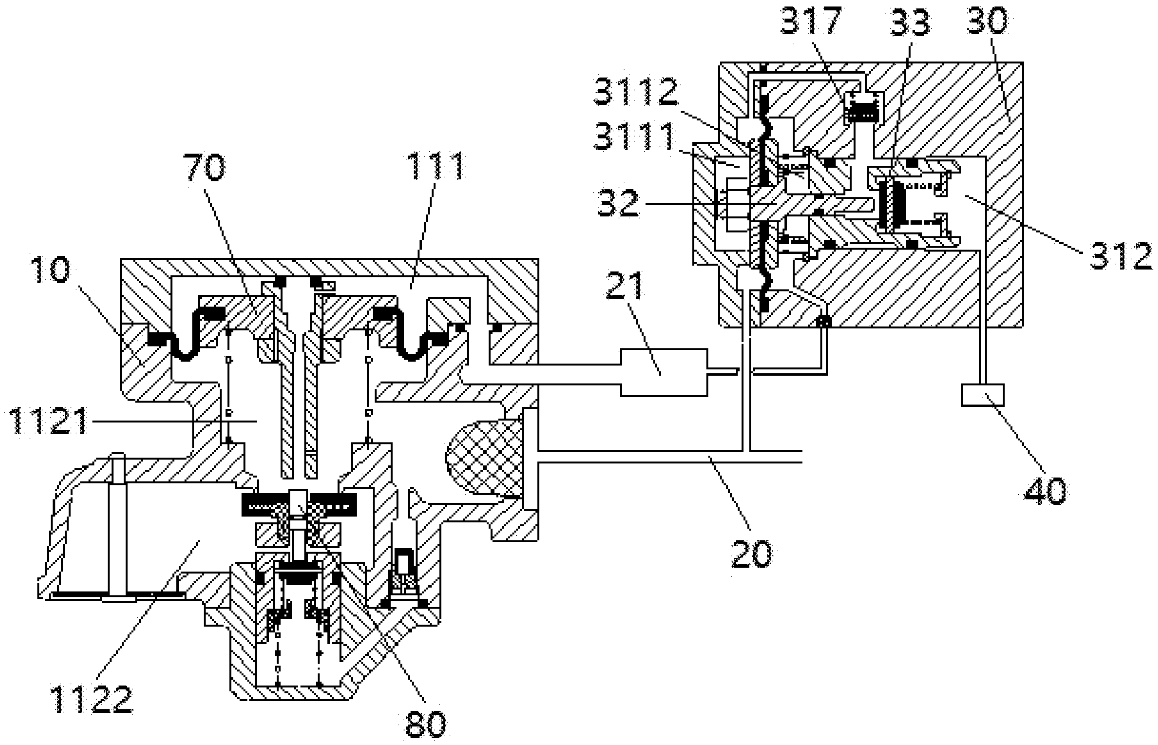
FIG. 2 shows a principle diagram in which an emergency valve having an emergency accelerated release function is located at a blocking position provided according to embodiments of the present disclosure.

As shown in FIGS. 2 and 5, the inflation valve body 31 further includes a valve sleeve 315; the valve sleeve 315 is provided in the valve body main body 313, an outer side wall of the valve sleeve 315 is attached to an inner side wall of the valve body main body 313 to divide an inner cavity of the valve body main body 313 into the driving cavity 311 and the inflation cavity 312. An end of the first valve core 32 passes through the valve sleeve 315 and is arranged corresponding to the second valve core 33. The valve sleeve 315 can not only guide the piston rod 322 but also divide the inner cavity of the valve body main body 313.

In this embodiment, a second sealing ring is arranged between the valve sleeve 315 and a cavity wall of the valve body main body 313, two third sealing rings are sleeved on the piston rod 322, and the two third sealing rings are arranged at an interval along the length direction of the piston rod 322. By using both the second sealing ring and the third sealing rings, the sealing performance can be enhanced.

It should be noted that the valve sleeve 315 and the check valve body 314 are integrally formed; a radially-extending communication hole is provided on a side wall of the valve sleeve 315, the communication hole passes through the side wall of the valve sleeve 315; one end of the communication hole is in communication with an air outlet end of the check valve body 314, and the other end of the communication hole is in communication with an air inlet of an inflation passage. The described structure has the advantages of facilitating machining and installation.

Specifically, the inflation valve further includes an annular positioning plate connected with the inflation valve body 31, an annular boss is provided in the inflation valve body 31, the valve sleeve 315 is provided with an annular flange, and the annular flange is sandwiched between the annular positioning plate and the annular boss. By the described structure, the annular positioning plate and the annular boss can be used to position the valve sleeve 315.

As shown in FIG. 5, the inflation valve body 31 is also provided with an inflation passage 316; an air outlet 3164 of the inflation passage 316 is in communication with the air inlet of the first driving cavity 3111, and an air inlet 3165 of the inflation passage 316 is in communication with the air outlet of the inflation cavity 312. By using the inflation passage 316, the advantage of facilitating communication between the inflation cavity 312 and the first driving cavity 3111 is achieved.

A check valve 317 is arranged in the inflation passage 316; the check valve 317 includes a check valve core 3171 and a second check reset spring 3172; one end of the second check reset spring 3172 abuts against the check valve core 3171, and the other end of the second check reset spring 3172 abuts against the inflation valve body 31. By using the check valve 317, when the train is inflated for the first time, the pressurized air of the train pipe 20 can be prevented from being directly inflated into the brake cylinder 40 through the first driving cavity 3111.

Figure 7:
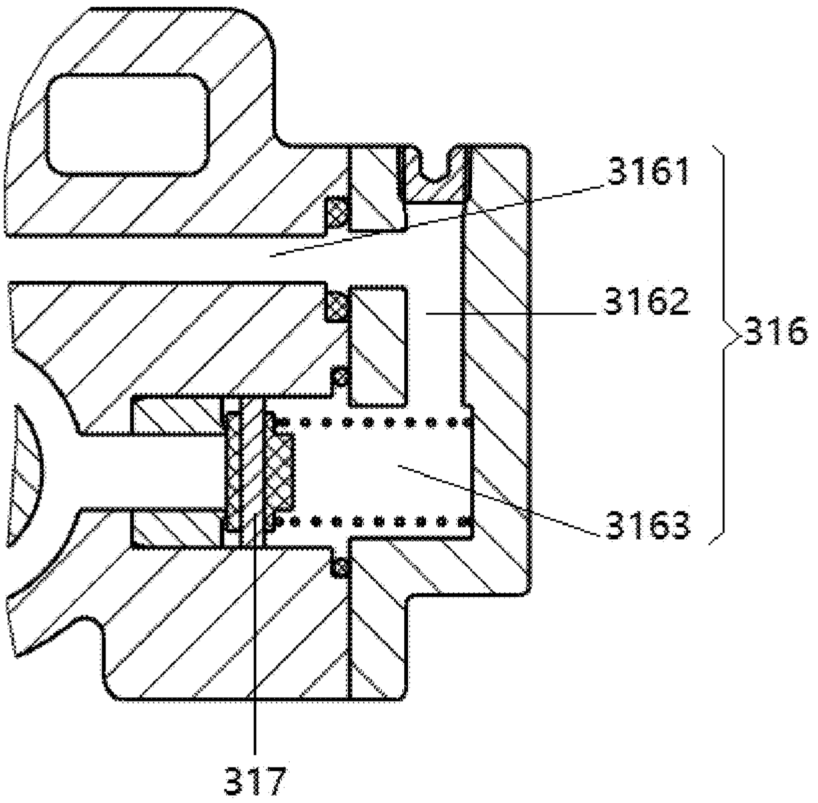
FIG. 7 shows a cross-sectional view of an inflation passage of an emergency valve having an emergency accelerated release function provided according to embodiments of the present disclosure.
Figure 8:
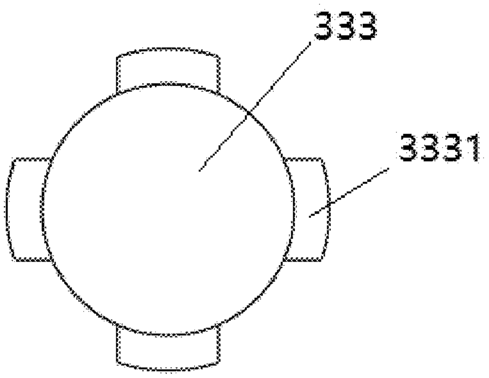
FIG. 8 shows a top view of a first ventilation plate of an emergency valve having an emergency accelerated release function provided according to embodiments of the present disclosure.
Figure 9:
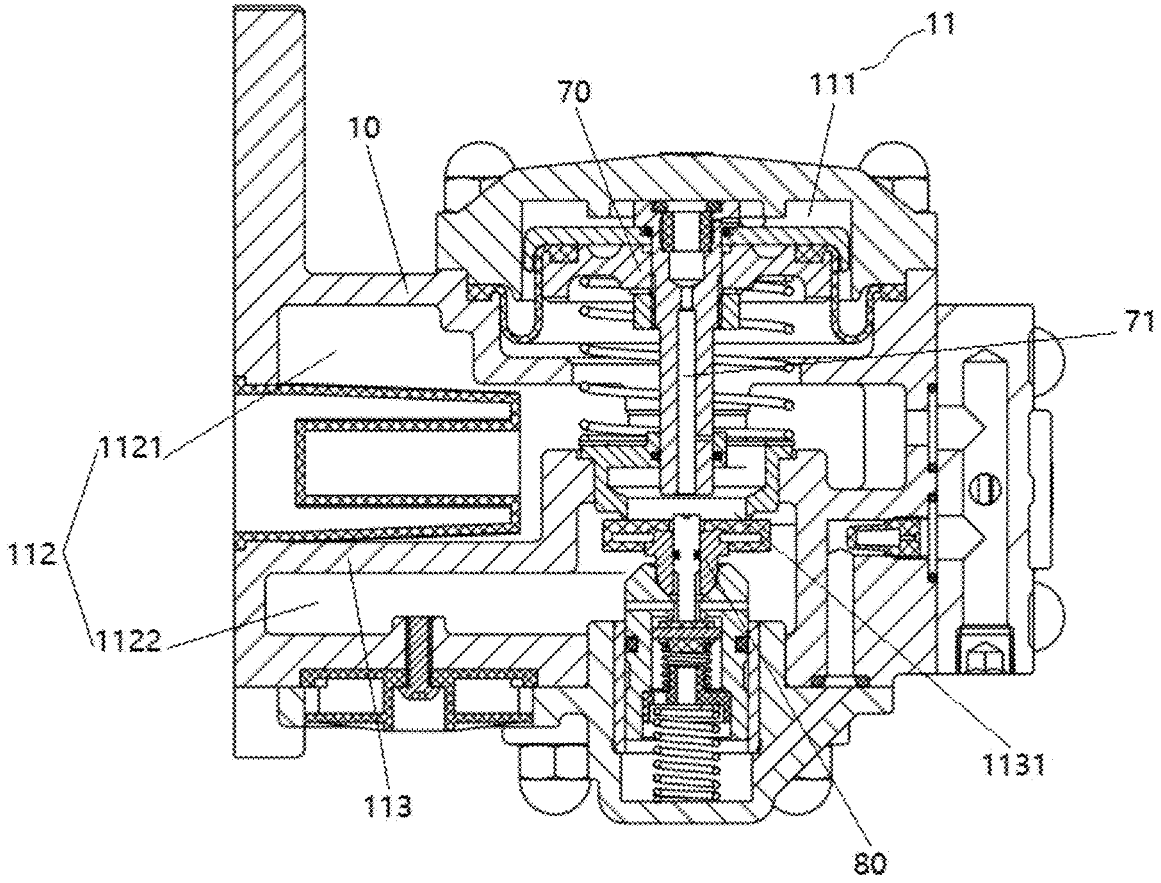
FIG. 9 shows a cross-sectional view of an emergency valve body of an emergency valve having an emergency accelerated release function provided according to embodiments of the present disclosure.

As shown in FIGS. 4 and 7, the emergency valve having an emergency accelerated release function further includes a first valve cover 50; the first valve cover 50 covers the inflation valve body 31, and the inflation passage 316 includes a first passage 3161, a second passage 3162 and a third passage 3163 in communication in sequence; the first passage 3161 and the third passage 3163 are arranged on the inflation valve body 31, and the second passage 3162 is arranged on the first valve cover 50. By using the first valve cover 50, the advantage of facilitating machining and installation is achieved.

In this embodiment, the first passage 3161 is in communication with an air outlet of the inflation valve body 31, the check valve 317 is arranged in the first passage 3161, and the third passage 3163 is in communication with the first driving cavity 3111.

Specifically, the check valve core 3171 includes a second ventilation plate 31711 and a second elastic cap 31712 sleeved on the second ventilation plate; a plurality of second protrusions are provided on a periphery of the second ventilation plate, the plurality of second protrusions are arranged at intervals along a circumferential direction of the second ventilation plate and extend along a radial direction of the second ventilation plate, and the second elastic cap is in sealed fit with the air inlet of the inflation passage 316. By the described structure, the inflation passage 316 can be blocked by using the second ventilation plate, and also the sealing performance of the check valve core 3171 can be enhanced by using the second elastic cap.

In the present embodiment, the inflation valve body 31 and the emergency valve body 10 are integrally formed. The described structure facilitates the miniaturization of the emergency valve having an emergency accelerated release function.

Figure 3:
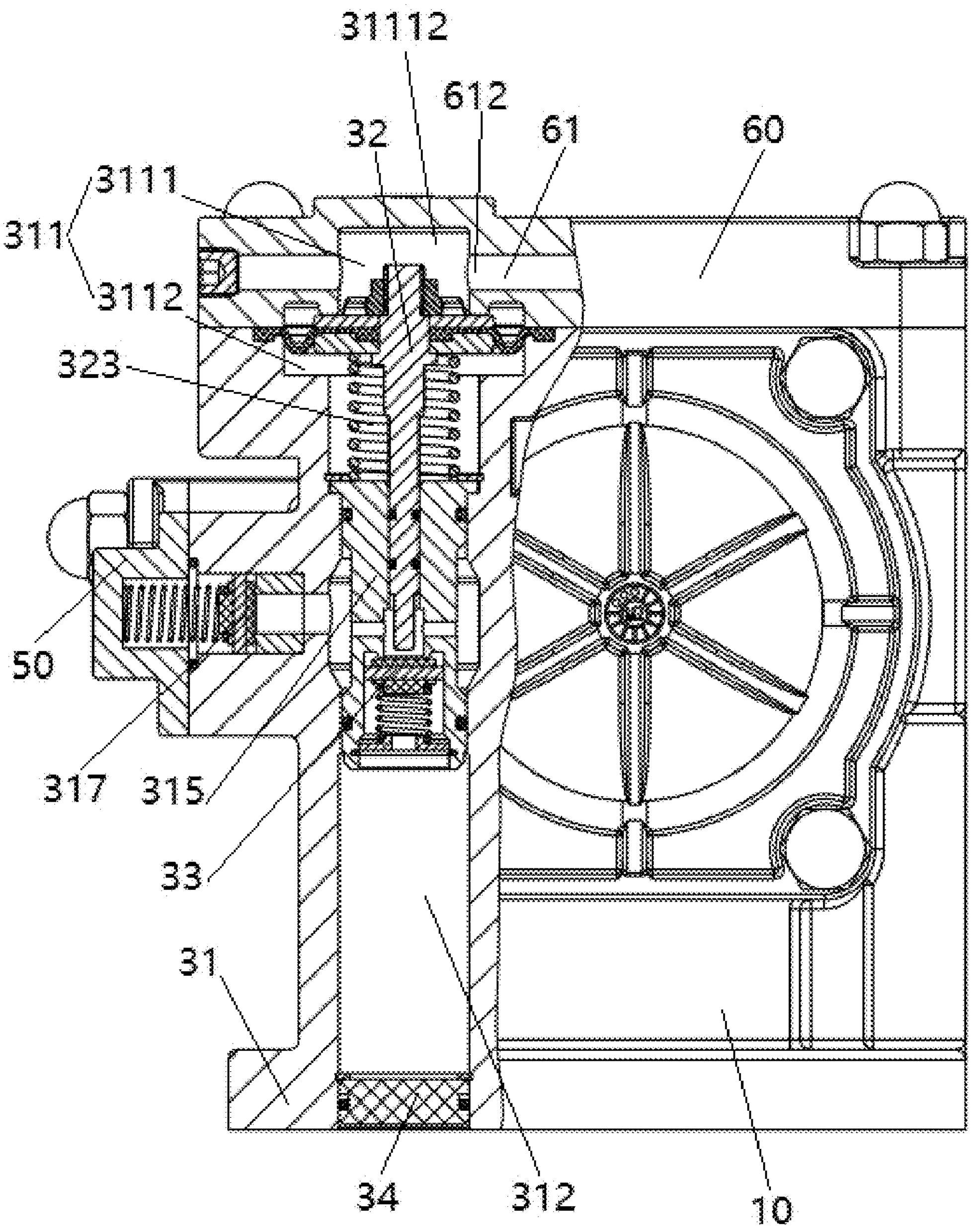
FIG. 3 shows a cross-sectional view of an inflation valve of an emergency valve having an emergency accelerated release function provided according to embodiments of the present disclosure.

As shown in FIG. 3, the emergency valve having an emergency accelerated release function also includes a second valve cover 60; the second valve cover 60 covers a same end of the emergency valve body 10 and the inflation valve body 31, a communication passage 61 is arranged on the second valve cover 60, an air inlet of the communication passage 61 is in communication with the emergency cavity 11, and an air outlet 612 of the communication passage 61 is in communication with the air outlet of the first driving cavity 3111. The communication passage 61 is arranged on the second valve cover 60, thereby achieving the advantage of facilitating machining and installation.

In this embodiment, an extension direction of the emergency cavity 11 is perpendicular to an extension direction of the inflation valve body 31. A communication position between the communication passage 61 and the emergency cavity 11 is arranged on the second valve cover 60. The second valve cover 60 covers the first driving cavity 3111, and is in communication with the first driving cavity 3111.

Figure 10:
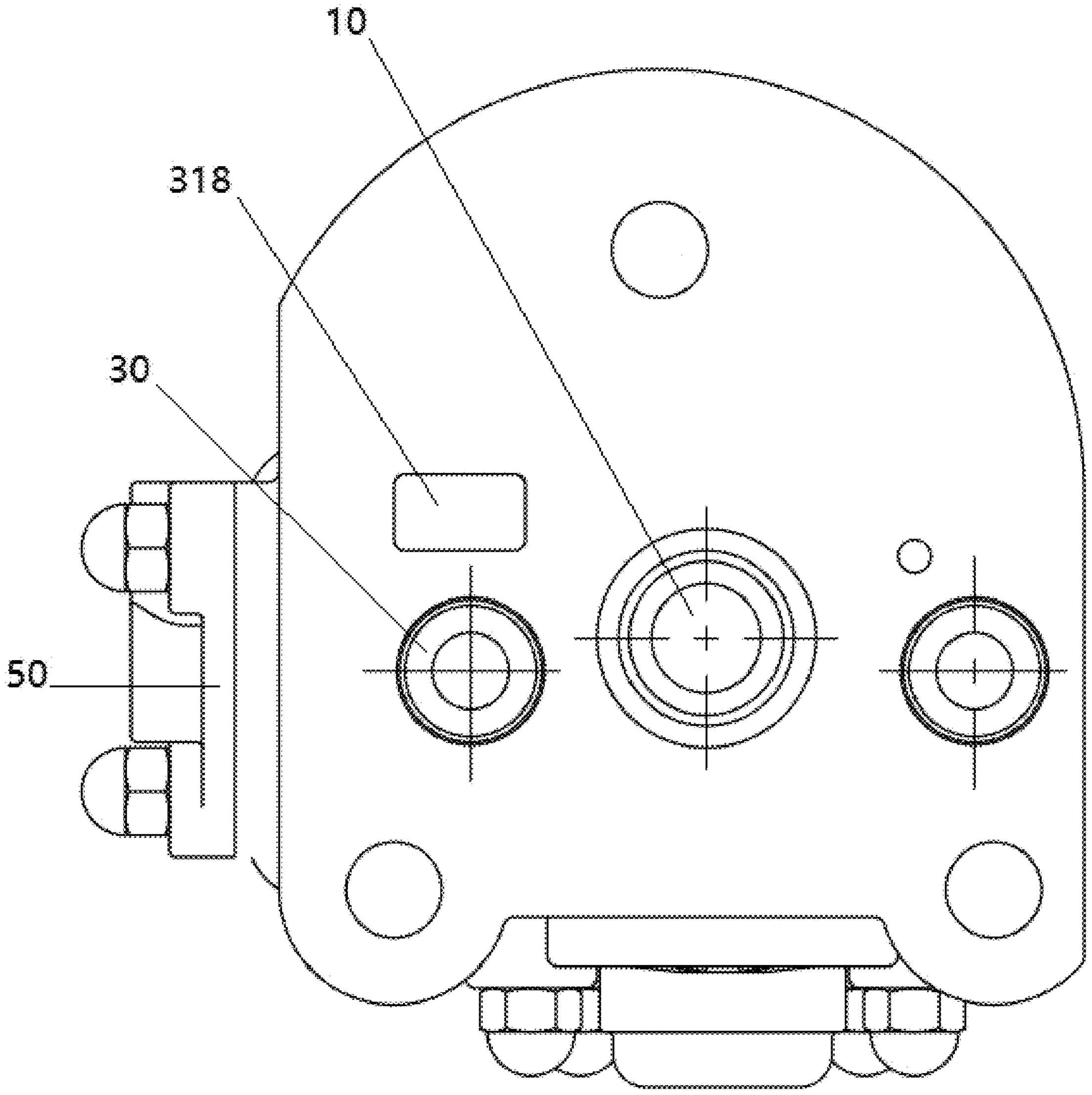
FIG. 10 shows a side view of an emergency valve having an emergency accelerated release function provided according to embodiments of the present disclosure.
Figure 11:
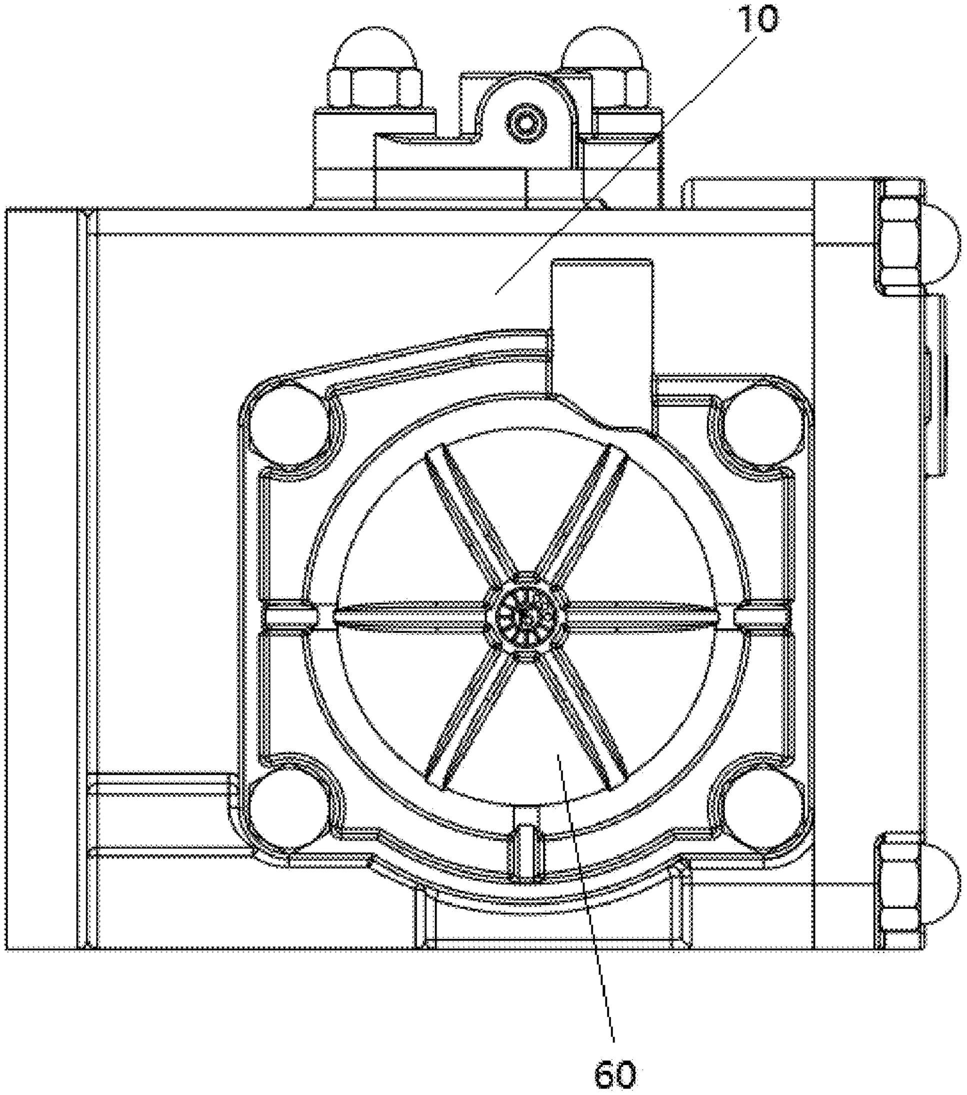
FIG. 11 shows a top view of an emergency valve having an emergency accelerated release function provided according to embodiments of the present disclosure.

As shown in FIGS. 4 and 10, the inflation valve body 31 is further provided with an emergency passage 318 and an air inlet passage 319 arranged at an interval; a first end of the emergency passage 318 is in communication with the emergency chamber 21, and a second end of the emergency passage 318 is in communication with the second driving cavity 3112; a first end of the air inlet passage is in communication with the air inlet of the inflation cavity 312, and a second end of the air inlet passage is in communication with the brake cylinder 40; the air inlet of the emergency cavity 11, the first end of the emergency passage 318 and the second end of the air inlet passage are all arranged at an end of the emergency valve having an emergency accelerated release function away from the second valve cover 60. The use of the emergency passage 318 and the air inlet passage has the advantage of facilitating arrangement and communication, and the air inlet of the emergency cavity 11, the first end of the emergency passage 318 and the second end of the air inlet passage are all arranged at one end of the emergency valve, thereby facilitating the miniaturization of the emergency valve.

In this embodiment, the air inlet passage is arranged in the inflation cavity 312.

As shown in FIGS. 4 and 5, the emergency passage 318 is provided with a necked plug 3181, the necked plug 3181 has a central hole 31811 extending along an axial direction of the emergency passage 318. By using the necked plug 3181, the inflation speed of the second driving cavity 3112 can be smaller than the inflation speed of the first driving cavity 3111, and then by using the pressure difference between the first driving cavity 3111 and the second driving cavity 3112, the first valve core 32 can be driven to move.

The inflation valve body 31 has an inclined hole 3182, and the emergency passage 318 is in communication with the second driving cavity 3112 through the inclined hole 3182. By using the inclined hole 3182, the advantage of facilitating communication between the emergency passage 318 and the second driving cavity 3112 is achieved.

Specifically, the piston cap 321 includes a first flat plate 3211, a second flat plate 3212 and an elastic pad 3213; an inner ring of the elastic pad 3213 is sandwiched between the first flat plate 3211 and the second flat plate 3212, an outer ring of the elastic pad 3213 is in sealed fit with the cavity wall of the driving cavity 311, and the piston rod 322 passes through the first flat plate 3211, the second flat plate 3212 and the elastic pad 3213 in sequence. The piston cap 321 having the described structure has the advantage of easy installation.

In this embodiment, the outer ring of the elastic pad 3213 is sandwiched between the inflation valve body 31 and the second valve cover 60, so as to separate the first driving cavity 3111 from the second driving cavity 3112. The elastic pad 3213 has a bending region in a region between the inner ring and the outer ring. By using the bending region, buffer can be provided for deformation of the elastic pad 3213.

The piston cap 321 further includes a locking nut 3214; a side wall of the piston rod 322 has an annular convex rib 3221 extending in a radial direction of the piston rod 322; the first flat plate 3211 abuts against the annular convex rib 3221, the locking nut 3214 abuts against the second flat plate 3212 and is in threaded connection with the piston rod 322. By the described structure, the piston cap 321 can be fixed by using the annular convex rib 3221 and the locking nut 3214, thereby achieving the advantage of a simple fixing structure.

In this embodiment, the first valve core 32 further includes a piston reset spring 323; one end of the piston reset spring 323 abuts against the piston cap 321, and the other end of the piston reset spring 323 abuts against the inflation valve body 31. By using the piston reset spring 323 and using the elastic force of the spring, the first valve core 32 can be located at the blocking position at which the first valve core is separated from the second valve core 33.

In this embodiment, when the air pressures of the first driving cavity 3111 and the second driving cavity 3112 are equal to each other, and under the action of the piston reset spring 323, the first valve core 32 is located at the blocking position at which the second valve core 33 is released. When the pressure of the first driving cavity 3111 is greater than the pressure of the second driving cavity 3112, under the driving of the pressure difference, the first valve core 32 pushes the second valve core 33 away from the air outlet of the inflation cavity 312 to be in the inflation position, and at this time, the piston reset spring 323 is in a compressed state.

As shown in FIGS. 3 and 4, the inflation valve 30 further includes a dust filter 34 and a retaining ring 35; the dust filter 34 is arranged at an end of the driving cavity 311 away from the piston cap 321, the retaining ring is connected with an inner side wall of the inflation valve body 31, and an end of the dust filter 34 is attached to a side surface of the retaining ring. Air can be filtered by using the dust filter 34, preventing dust from entering the inflation valve 30; and the dust filter 34 can be positioned by using the retaining ring.

In this embodiment, the emergency valve having an emergency accelerated release function further includes a driving assembly 70; the driving assembly 70 movably arranged in the emergency cavity 11, the driving assembly 70 divides the emergency cavity 11 into an upper emergency cavity 111 and a lower emergency cavity 112, and the driving assembly 70 has a transition hole 71, the transition hole 71 communicates between the upper emergency cavity 111 and the lower emergency cavity 112. By using the driving assembly 70, the emergency valve can rapidly evacuate pressurized air in the lower emergency cavity 112, thereby achieving quick braking of the train.

In this embodiment, the upper emergency cavity 111 can be inflated through the transition hole 71, but the inflation speed of the upper emergency cavity 111 is lower than the inflation speed of the lower emergency cavity 112. In turn, the driving assembly 70 can move by the pressure difference between the upper emergency cavity 111 and the lower emergency cavity 112.

It should be noted that, the emergency valve having an emergency accelerated release function further includes an air discharge valve assembly 80; the air discharge valve assembly 80 is located in the lower emergency cavity 112, the driving assembly 70 is located above the air discharge valve assembly 80; a partition plate 113 is provided in the emergency cavity 11, and the partition plate 113 divides the lower emergency cavity 112 into an air inlet cavity 1121 and an exhaust cavity 1122 located below the air inlet cavity 1121, and the partition plate 113 has a deflation hole 1131, the air discharge valve assembly 80 being movably arranged at the deflation hole 1131. By using the air discharge valve assembly 80, when the train is in a non-emergency braking working condition, pressurized air in the train pipe cannot be evacuated by the emergency valve having an emergency accelerated release function. When the train is in an emergency braking working condition, the air discharge valve assembly 80 is driven by the driving assembly 70 such that an air discharge valve is located in an open position, thereby enabling the emergency valve having an emergency accelerated release function to quickly evacuate the pressurized air in the train pipe.

Specifically, when the train is subjected to emergency braking, air in the train pipe is exhausted, and the upper emergency cavity 111 exhausts air to the train pipe through the transition hole 71, and the lower emergency cavity 112 directly exhausts air to the train pipe; due to the existence of the transition hole 71, the exhaust speed of the upper emergency cavity 111 is lower than the exhaust speed of the lower emergency cavity 112, such that the pressure of the upper emergency cavity 111 is greater than the pressure of the lower emergency cavity 112; and when the driving assembly 70 moves downward along the axis of the driving assembly 70 until the driving assembly comes into contact with the air discharge valve assembly 80, the driving assembly 70 drives the air discharge valve assembly 80 to move downward, and the air discharge valve assembly 80, together with the driving assembly 70, moves downward along the axis of the driving assembly 70; and the air discharge valve assembly 80 moves from blocking the deflation hole 1131 to opening the deflation hole 1131, such that the train pipe can be quickly exhausted through the exhaust cavity 1122.

The content above merely relates to preferred embodiments of the present disclosure, and is not intended to limit the present disclosure. For a person skilled in the art, the present disclosure may have various modifications and changes. Any modifications, equivalent replacements, improvements and the like made within the spirit and principle of the present disclosure shall all fall within the scope of protection of the present disclosure.

The invention claimed is:

1. An emergency valve having an emergency accelerated release function, the emergency valve having an emergency accelerated release function comprising:

an emergency valve body, having an emergency cavity, an air inlet of the emergency cavity being in communication with a train pipe; and an inflation valve, comprising an inflation valve body, a first valve core and a second valve core, wherein the inflation valve body has a driving cavity and an inflation cavity which are spaced apart; the first valve core is movably arranged in the driving cavity and divides the driving cavity into a first driving cavity and a second driving cavity, and the second valve core is movably arranged at an air outlet of the inflation cavity, and an air inlet of the inflation cavity is in communication with a brake cylinder, the air outlet of the inflation cavity is in communication with an air inlet of the first driving cavity, and an air outlet of the first driving cavity is in communication with the emergency cavity, and the second driving cavity is in communication with an emergency chamber; wherein the first valve core has an inflation position at which the second valve core is pushed away from the air outlet of the inflation cavity, and a blocking position at which the second valve core is released.

2. The emergency valve having an emergency accelerated release function according to claim 1, wherein the first valve core comprises a piston cap and a piston rod connected with each other; wherein an outer edge of the piston cap is attached to a cavity wall of the driving cavity and divides the driving cavity into the first driving cavity and the second driving cavity, and an end of the piston rod is arranged corresponding to the second valve core.

3. The emergency valve having an emergency accelerated release function according to claim 2, wherein the piston cap; comprises a first flat plate, a second flat plate and an elastic pad; an inner ring of the elastic pad is sandwiched between the first flat plate and the second flat plate, an outer ring of the elastic pad is in sealed fit with the cavity wall of the driving cavity, and the piston rod passes through the first flat plate, the second flat plate and the elastic pad in sequence; the piston cap further comprises a locking nut; a side wall of the piston rod has an annular convex rib extending in a radial direction of the piston rod; the first flat plate; abuts against the annular convex rib, the locking nut abuts against the second flat plate and is in threaded connection with the piston rod; and the first valve core further comprises a piston reset spring; one end of the piston reset spring abuts against the piston cap, and the other end of the piston reset spring abuts against the inflation valve body.

4. The emergency valve having an emergency accelerated release function according to claim 2, wherein the inflation valve further comprises a dust filter and a retaining ring; the dust filter is arranged at an end of the driving cavity away from the piston cap, the retaining ring is connected with an inner side wall of the inflation valve body, and an end of the dust filter is attached to a side surface of the retaining ring; the emergency valve having an emergency accelerated release function further comprises a driving assembly; the driving assembly movably arranged in the emergency cavity, the driving assembly divides the emergency cavity into an upper emergency cavity and a lower emergency cavity, and the driving assembly has a transition hole, the transition hole communicates between the upper emergency cavity and the lower emergency cavity; and the emergency valve having an emergency accelerated release function further comprises an air discharge valve assembly; the air discharge valve assembly is located in the lower emergency cavity, the driving assembly is located above the air discharge valve assembly; and a partition plate is provided in the emergency cavity, and the partition plate divides the lower emergency cavity into an air inlet cavity and an exhaust cavity located below the air inlet cavity, and the partition plate has a deflation hole, the air discharge valve assembly being movably arranged at the deflation hole.

5. The emergency valve having an emergency accelerated release function according to claim 1, wherein the inflation valve body comprises a valve body main body and a check valve body, wherein the valve body main body has the driving cavity and the inflation cavity; the check valve body is arranged in the inflation cavity and is attached to a cavity wall of the inflation cavity, the air outlet of the inflation cavity is a valve port of the check valve body, and the second valve core is movably arranged in the check valve body.

6. The emergency valve having an emergency accelerated release function according to claim 5, wherein both ends of the check valve body are of an open structure, one end of the check valve body is the valve port of the check valve body, and the other end of the check valve body is provided with a support plate; a first check reset spring is provided between the second valve core and the support plate; and/or the second valve core comprises a first ventilation plate and a first elastic cap sleeved on the first ventilation plate; a plurality of first protrusions are provided on a periphery of the first ventilation plate, the plurality of first protrusions are arranged at intervals along a circumferential direction of the first ventilation plate and extend along a radial direction of the first ventilation plate, and the first elastic cap is in sealed fit with the air outlet of the inflation cavity.

7. The emergency valve having an emergency accelerated release function according to claim 5, wherein the inflation valve body further comprises a valve sleeve, wherein the valve sleeve is arranged in the valve body main body, an outer side wall of the valve sleeve is attached to an inner side wall of the valve body main body to divide an inner cavity of the valve body main body into the driving cavity and the inflation cavity; and an end of the first valve core passes through the valve sleeve and is arranged corresponding to the second valve core.

8. The emergency valve having an emergency accelerated release function according to claim 1, wherein the inflation valve body is further provided with an inflation passage, an air outlet of the inflation passage is in communication with the air inlet of the first driving cavity, and an air inlet of the inflation passage is in communication with the air outlet of the inflation cavity; a check valve is arranged in the inflation passage; the check valve comprises a check valve core and a second check reset spring; one end of the second check reset spring abuts against the check valve core, and the other end of the second check reset spring abuts against the inflation valve body.

9. The emergency valve having an emergency accelerated release function according to claim 8, wherein the emergency valve having an emergency accelerated release function further comprises a first valve cover; the first valve cover covers the inflation valve body, and the inflation passage comprises a first passage, a second passage and a third passage in communication in sequence; the first passage and the third passage are arranged on the inflation valve body, and the second passage is arranged on the first valve cover; and/or the check valve core comprises a second ventilation plate and a second elastic cap sleeved on the second ventilation plate; a plurality of second protrusions are provided on a periphery of the second ventilation plate, the plurality of second protrusions are arranged at intervals along a circumferential direction of the second ventilation plate and extend along a radial direction of the second ventilation plate, and the second elastic cap is in sealed fit with the air inlet of the inflation passage.

10. The emergency valve having an emergency accelerated release function according to claim 1, wherein the inflation valve body and the emergency valve body are integrally formed.

11. The emergency valve having an emergency accelerated release function according to claim 10, wherein the emergency valve having an emergency accelerated release function also comprises a second valve cover; the second valve cover covers a same end of the emergency valve body and the inflation valve body, a communication passage is arranged on the second valve cover, an air inlet of the communication passage is in communication with the emergency cavity, and an air outlet of the communication passage is in communication with the air outlet of the first driving cavity.

12. The emergency valve having an emergency accelerated release function according to claim 11, wherein the inflation valve body is further provided with an emergency passage and an air inlet passage arranged at an interval; a first end of the emergency passage is in communication with the emergency chamber, and a second end of the emergency passage is in communication with the second driving cavity; a first end of the air inlet passage is in communication with the air inlet of the inflation cavity, and a second end of the air inlet passage is in communication with the brake cylinder; the air inlet of the emergency cavity, the first end of the emergency passage and the second end of the air inlet passage are all provided at an end of the emergency valve having an emergency accelerated release function away from the second valve cover.

13. The emergency valve having an emergency accelerated release function according to claim 12, wherein the emergency passage is provided with a necked plug, the necked plug; has a central hole extending along an axial direction of the emergency passage; and/or the inflation valve body has an inclined hole, and the emergency passage is in communication with the second driving cavity through the inclined hole.

* * * * *